Oct. 24, 1967 W. B. ZERN 3,348,869
SLIDE FASTENER ACTUATING DEVICES
Filed July 8, 1965 4 Sheets-Sheet 2

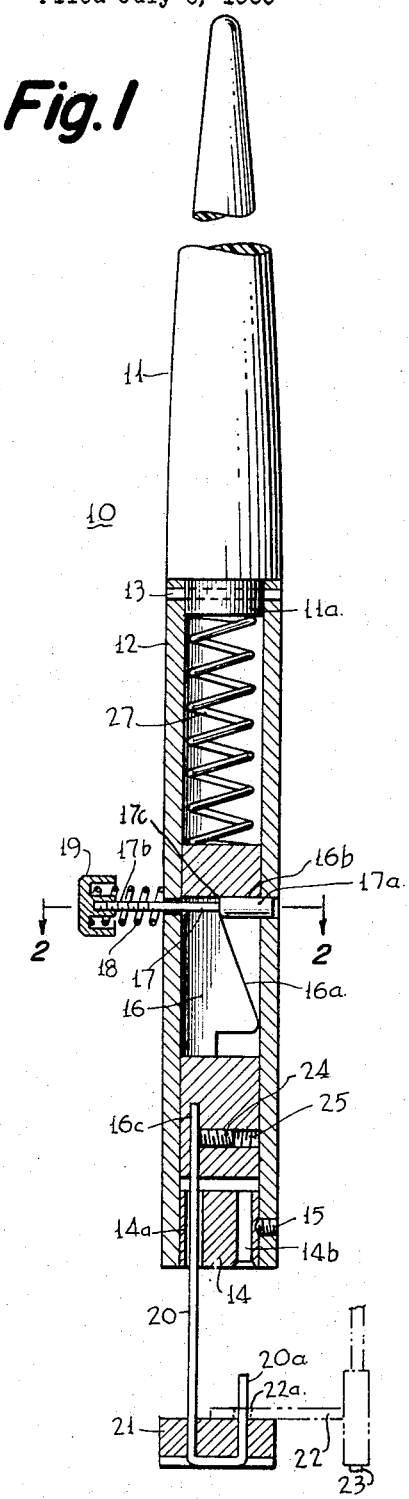
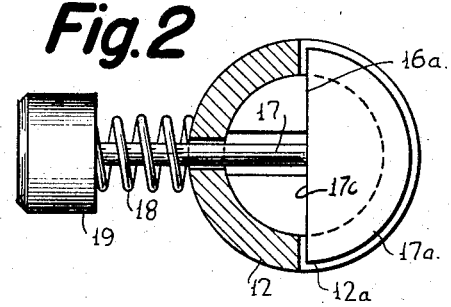
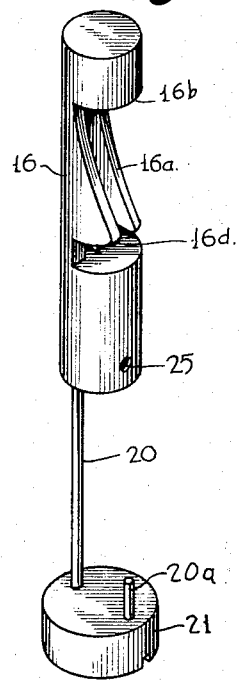
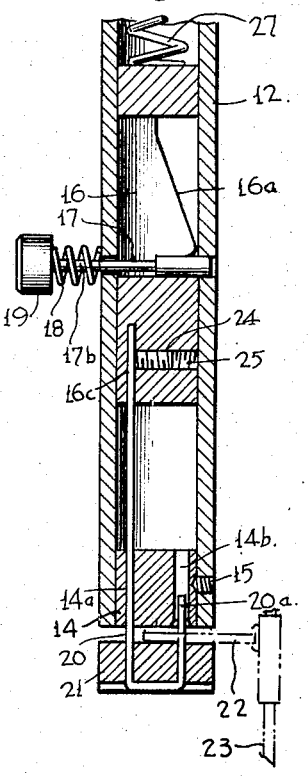

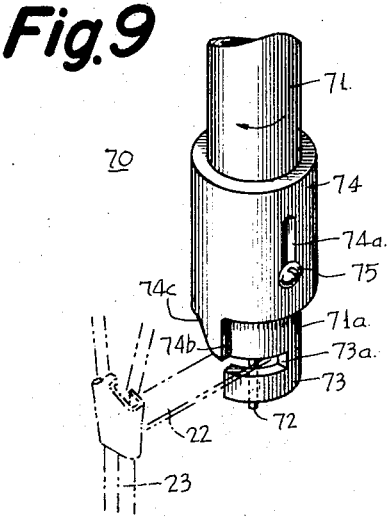
Fig. 9
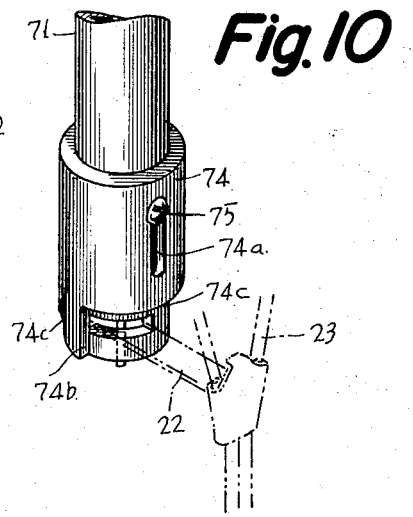
Fig. 10
Fig. 11
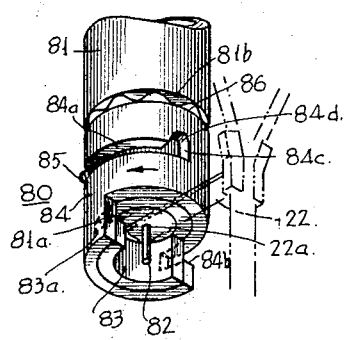
Fig. 12
Fig. 13
Fig. 14

Oct. 24, 1967  W. B. ZERN  3,348,869
SLIDE FASTENER ACTUATING DEVICES
Filed July 8, 1965  4 Sheets-Sheet 4

United States Patent Office 3,348,869
Patented Oct. 24, 1967

3,348,869
SLIDE FASTENER ACTUATING DEVICES
Warren B. Zern, 1016 N. Evans and Mineral Sts.,
Pottstown, Pa. 19464
Filed July 8, 1965, Ser. No. 470,412
26 Claims. (Cl. 294—19)

This invention relates to actuating devices for zippers and the like and has for an object the provision of improved slide fastener actuating devices. This invention is a continuation-in-part and an improvement on my invention disclosed in my co-pending application Ser. No. 464,623, filed June 17, 1965, issued Oct. 11, 1966, as Patent No. 3,278,215.

It is quite customary today to provide womens' clothing such as dresses and bathing suits with mechanical closures in the form of "zippers" which are located on the back of the clothing. Such zippers are of substantial length often extending from the neck to the waist of the garment. The zippers are frequently difficult to operate by reason of their location and the difficulty of operation becomes increased when the slide fastener becomes stuck. It is not unusual for a slide fastener to become stuck when a loose thread or a piece of the fabric becomes caught in the slide fastener. Under such circumstances it becomes necessary to apply a greater force to the slide fastener than normally used and such force may need to be either in the direction of opening or closing the fastener as may be required to break the slide fastener loose from its stuck position.

Many slide fastener actuating devices have been proposed heretofore however they have left something to be desired. For example the slide fastener actuating devices of the pull string type only permit operation of the device in one direction and thus are not suitable for push and pull operation as is normally required to break a stuck fastener loose. While other slide fasteners have been proposed with rigid or semi-rigid handles their attachment devices to the zipper tab have not been of sufficiently positive construction to enable the operator to firmly pull the zipper or push the zipper as may be required to free the zipper when it is in stuck condition.

My aforesaid co-pending application discloses a slide fastener actuating device which eliminates the foregoing problems nevertheless it is necessary that the operator maintain the handle in a particular position relative to its longitudinal axis in order to avoid dislodging the zipper fastener from the end thereof prior to completion of the zipper opening or closing operation. The present invention eliminates this requirement by providing adjustable means for locking the slide fastener to the actuating device and wherein the adjustable locking means is of rugged construction so that it will not be accidentally disengaged from the slide fastener but at the same time is easily locked or unlocked by the operator as required.

In accordance with the present invention there is provided a device for actuating a slide fastener of the type having a pull tab with an opening therein. Such device comprises a handle of rod-like construction having pin structure carried at one end of the handle and extending longitudinally thereof. The pin structure has a diameter sufficiently small to extend through the opening in the slide fastener tab. Structure is carried by the device and cooperates with the one end of the handle to form opposite walls of at least one slot extending transversely of the pin structure and beyond the one end of the handle. The slot is constructed and arranged to receive the slide fastener tab after it is positioned on the pin structure and the tab engaging walls of the slot cooperate with the pin structure in maintaining the slide fastener tab substantially perpendicular to the longitudinal axis of the handle during both push and pull longitudinal movements of the handle. In addition to the pin structure there is provided means to releasably lock the slide fastener tab in the slot.

For further objects and advantages of the invention reference is to be had to the following description taken in conjunction with the accompanying drawings in which:

FIG. 1 is an elevational view partly in section of a slide fastener actuating device embodying the present invention;

FIG. 2 is a cross sectional view taken along the plane 2—2 in FIG. 1;

FIG. 3 is a perspective view of the slide member of the embodiment shown in FIGS. 1 and 2;

FIG. 4 is a view similar to FIG. 1 but with the device in closed or locked position;

FIG. 9 is an elevational view of another modification of the invention;

FIG. 10 is an elevational view similar to FIG. 9 but with the device in locked position;

FIG. 11 is an elevational view of another modification of the invention;

FIG. 12 is a bottom end view of the modification shown in FIG. 11 with the device in unlocked position;

FIG. 13 is a bottom end view of the device shown in FIG. 11 with the device in locked position;

FIG. 14 is a perspective view of another modification of the invention;

Figure 5:
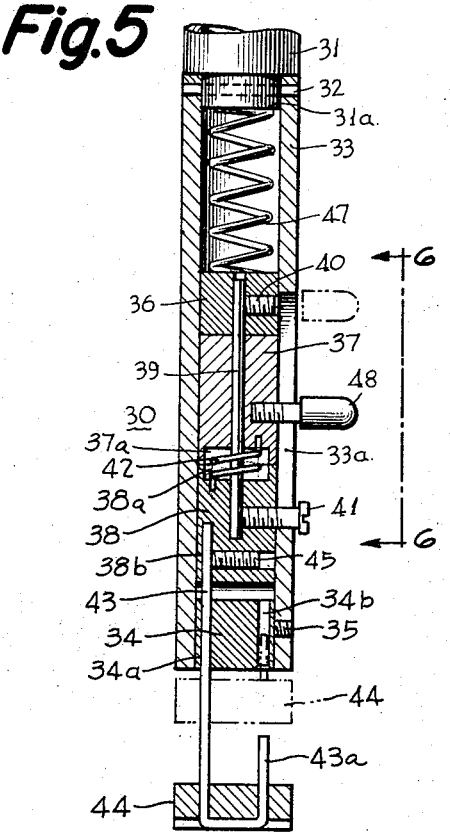
FIG. 5 is an elevational view partly in section of a modification of the invention.

Referring to FIGS. 1–4 there is illustrated a slide fastener actuating device embodying the preferred form of the invention. The device 10 is provided with a handle 11 of rigid or semi-rigid rod-like construction. The handle 11 may be made of metal, wood or plastic or any other suitable material. The lower end of the handle 11 is provided with an extension of reduced diameter 11a on which is adapted to be secured a tubular member 12 as by a cross pin 13. The member 12 is hollow and serves as an extension of the handle 11. The lower end of the sleeve or tubular member 12 is provided with a plug or end member 14 having a pair of longitudinal passages 14a and 14b extending therethrough. The end member 14 is adapted to be secured in the lower end of the sleeve 12 as by a screw 15. Positioned within the sleeve 12 is a slide member 16 which may best be seen in FIG. 3. The slide member 16 is adapted to be maintained in the position shown in FIG. 1 by means of a compression spring 27 contained within the upper end of the sleeve 12. The compression spring 27 is adapted to abut the lower end of the projection 11a and the adjacent end of the slide member 16.

As may be seen in FIG. 3 the slide member 16 is provided with a sloping or inclined cam surface 16a which is inclined from the outer periphery of the slide member 16 to a perpendicular shoulder 16b. As may be seen in FIG. 1 the compression spring 27 is adapted to maintain the shoulder 16b against the enlarged head 17a of a lock or cross-pin 17 which extends transversely of the longitudinal axis of the device 10. The head 17a is adapted to extend into a slot 12a in the sleeve 12 as may be seen in FIGS. 1 and 2. The end of the cross-pin 17 opposite the head thereof is provided with a threaded section 17b around which extends a compression spring 18. As may be seen in FIGS. 1 and 2 one end of the compression spring 18 is adapted to engage the outer surface of the sleeve 12 while the opposite end of the spring 18 is adapted to be received within a cup shaped nut member 19 which is threaded onto the threaded section 17b of the cross-pin 17. With this construction it will be seen that the spring 18 maintains the flat surface 17c of the head 17a in engagement with the cam surface 16a of the slide member 16.

The lower end of the slide member 16 is provided with a longitudinal opening 16c into which extends a pin means or wire member 20 shaped in the form of a hook. The hook shaped end of the wire member 20 is provided with a button member 21 having a pair of openings therethrough through which the wire member 20 extends as shown in FIG. 1. The return end portion 20a of the wire 20 is adapted to extend through the opening 22a in the slide fastener tab 22 of the zipper 23. A conventional zipper 23 which comprises the usual pair of interlocking teeth carried by tapes which are sewed to the fabric of the garment has been illustrated in FIG. 1. The zipper 23 and the slide fastener with tab 22 are of well known conventional construction and thus no further explanation of them is believed necessary. The wire 20 is adapted to be secured to the lower end of the slide member 16 as by a screw 24 which is inserted into the transverse threaded opening 25, FIG. 3, of the slide member 16. Thus it will be seen that the wire member 20 and its hook end including the pin portion 20a thereof is adapted to move longitudinally of the device 20 with the slide member 16.

After the slide fastener tab 22 has been placed on the pin 20a as shown in FIG. 1 the operator presses the lower end of button member 21 causing the slide member 16 to move upwardly and compress the spring 27, FIG. 1. The cam surface 16a rides against the flat surface 17c of the head 17a causing the latter to be moved outwardly of the slot 12a against the compression of spring 18. When the slide member 16 reaches the upper end of its movement the cross slot 16d at the lower end of the inclined cam surface 16a will be in alignment with the head 17a. The compression spring 18 will automatically cause the head 17a to move inwardly into the slot 16d thus locking the slide member 16 in position. At this time the pin 20a which extends through the opening 22a in the slide fastener tab 22 will have been moved upwardly in FIG. 1 so that the pin 20a extends into the passage 14b in end member 14 as shown in FIG. 4.

With the parts in this position the device 10 is ready to be pushed or pulled longitudinally by handle 11 to move the slide fastener and its tab 22 along the zipper 23 in the direction required to either open or close the zipper. The button member 21 as illustrated in FIGS. 1, 3 and 4 has a transverse surface which cooperates with the lower end of the sleeve 12 and the end member 14 to form a transverse slot the opposite walls of which have substantially planar support surfaces for engaging the tab of the slide fastener to maintain the slide fastener tab 22 substantially perpendicular to the pin 20a and to the zipper 23. It will be noted in FIG. 4 that the pin 20a extends into the passage 14b when the device 10 is in locked position and thus the slide fastener tab 22 cannot become accidentally disconnected from the pin 20a. This construction is particularly desirable since it avoids the possibility of the device 10 from being disconnected from the slide fastener tab 22 when the slide fastener may be partially closed or open and particularly when the slide fastener tab 22 is in a position on the wearer or operator which is relatively inaccessible or difficult to reach. The spring 18 maintains the enlarged head 17a firmly in the cross slot 16d regardless of how hard the operator pushes or pulls on the handle 11 of the device 10.

The device 10 is provided with a construction which readily enables the operator to release the pin 20a from the slide fastener tab 22. This is accomplished after the operator has moved the slide fastener tab 22 to the desired position which is normally when the slide fastener is either at one end or the other of the zipper 23.

To release the slide fastener tab 22 the operator presses on the outer end of the member 19 whereby compressing the spring 18 and causing the enlarged head member 17a to move outwardly of the slot 12a in the sleeve 12. When the head member 17a has moved beyond the end of the slot 16d the upper compression spring 27 will cause the slide member 16 to move toward the outer end thereof and thus to the position illustrated in FIG. 1. In this position it will be seen that the slide fastener tab 22 may be readily removed from the pin 20a. Thus it will be seen that in the embodiment of the device 10 illustrated in FIGS. 1–4 the slide fastener tab 22 will be secured to the device 10 when the operator presses the lower end or button 21 and moves the parts to closed position as shown in FIG. 4. It will also be seen that the slide fastener tab 22 will be released from the device 10 when the operator presses the member 19 on the lock pin 17 to move the parts to the open position as shown in FIG. 1.

Figure 6:
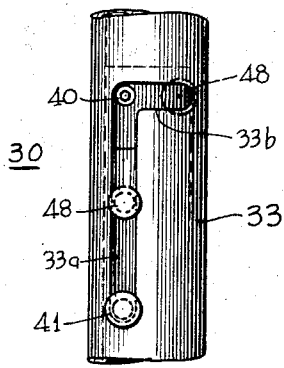
FIG. 6 is a fractional view taken in the direction 6—6 of the modification shown in FIG. 5.

Referring to FIGS. 5 and 6 there is illustrated a modification of the invention. The slide fastener actuating device 30 in FIGS. 5 and 6 is provided with a handle 31 of rigid or semi-rigid rod-like construction. The handle 31 may be made of any suitable material as mentoned above. Secured to the handle 31 as by a pin 32 is a sleeve or tubular member 33 the lower end of which is provided with an end member 34 having a pair of longitudinal passages 34a and 34b extending therethrough. The end member 34 is adapted to be secured in the lower end of the sleeve 33 as by a screw 35. Positioned within the sleeve 33 is a slide device comprising three cylindrical members 36–38. A connecting member 39 extends through the members 36–38 with members 36 and 38 being locked to the opposite ends of the connecting member 39 by screw members 40 and 41 respectively. The intermediate cylindrical member 37 is adapted for rotation on the connecting member 39 by means of a torque spring 42 the opposite ends of which are respectively connected to the rotatable cylinder 37 and the non-rotatable cylinder 38. As may be seen in FIG. 5 the adjacent ends of cylinders 37 and 38 are provided with recesses 37a and 38a which cooperate to provide a housing for the torque spring 42. The member 38 is also provided with a longitudinal passage 38b into which extends a pin means or wire member 43 shaped in the form of a hook. The hook shaped end of the wire member 43 is provided with a button member 44 having a pair of openings therethrough through which the wire member 43 extends. The return end or pin portion 43a of the wire 43 is adapted to extend into the opening 22a in the slide fastener tab 22 of the zipper 23. The wire 43 is adapted to be secured to the lower end of the member 38 as by a screw 45 which is inserted into a transverse threaded opening in member 38.

A compression spring 47 is positioned between the upper end of member 36 and the adjacent end 31a of handle 31. The sleeve or tubular member 33 is provided with a longitudinal slot 33a having a transverse portion 33b, FIG. 6. The cylindrical members 36–38 are adapted to move as a unit and slide longitudinally of the tubular member 33. The center member 37 is provided with a handle 48 which projects outwardly through the slot 33a, FIG. 5. The screw 41 which is secured to the member 38 also extends through the slot 33a, FIGS. 5 and 6. When the torque spring 42 is assembled between the members 37 and 38 it is placed under tension so that it exerts a rotational force between members 37 and 38. This rotational force is effective to rotate the member 37 to the right as viewed in FIG. 6. To operate the device 30 shown in FIG. 5, the pin 43a is inserted through the opening in the slide fastener 22 (such as shown in FIG. 1) and the operator presses the lower end of button member 44 causing the three cylindrical members 36–38 to move upwardly and to compress the spring 47. This causes the screw 41 and the handle member 48 likewise to move upwardly of the slot 33a. When the button member 44 moves to the phantom line position shown in FIG. 5 the handle member 48 will have moved longitudinally of the slot 33a to a position in alignment with the transverse slot portion 33b, FIG. 6. Since the torque spring 42 is under tension and since the cylindrical member 37 is free to rotate on the connecting member 39, FIG. 5, the handle 48 will move into the cross slot 33b to the locked position shown in phantom lines in FIG. 6. The cylindrical member 38 does not rotate within the sleeve 33 as the screw 41 is maintained in the longitudinal slot 33a thus preventing the member 38 from rotating. The member 36 likewise does not rotate as it is secured to member 38 by the connecting member 39. When the button 44 has been moved to the locked or phantom line position shown in FIG. 5. it will be seen that the pin 43a extends into the opening 34b in the end member 34.

With the parts in this locked or closed position the device 30 is ready to be pushed or pulled longitudinally by handle 31 to move the slide fastener 22 (such as shown in FIG. 4) along the zipper 23 in the direction required to either open or close the zipper. The button member 44 cooperates with the lower end of the sleeve 33 and the end member 34 to form a transverse slot and maintain the slide fastener tab 22 substantially perpendicular to the pin 43a and to the zipper 23. Since the pin 43a extends into the passage 34b when the device 30 is in locked position, the slide fastener tab 22 cannot become accidentally disconnected from the pin 43a.

To release the pin 43a from the slide fastener tab 22 the operator rotates the handle 48 out of the cross slot 33b into alignment with the longitudinal slot 33a. At this time the compression spring 47 is effective to force the cylindrical members 36–38 downwardly of the sleeve 33 to return the parts of the device 30 to the open position illustrated in full line in FIG. 5.

Figure 7:
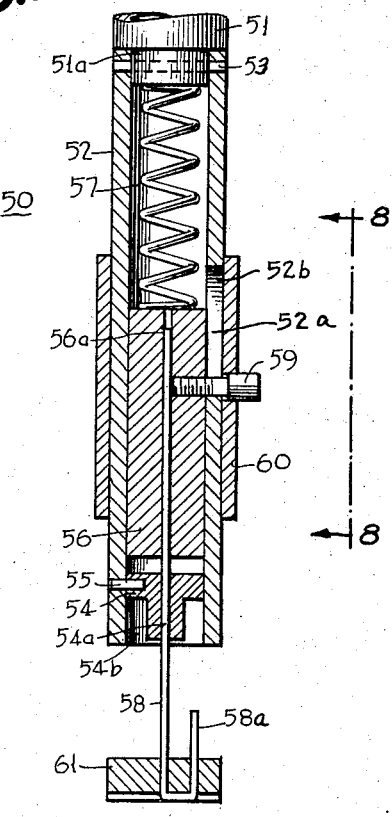
FIG. 7 is an elevational view partly in section of a further modification of the invention.
Figure 8:
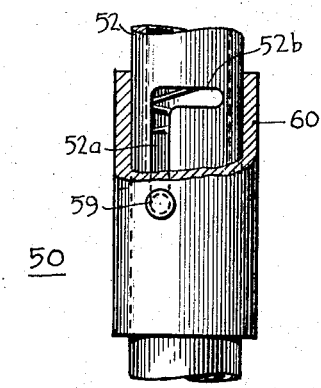
FIG. 8 is a fractional view taken in the direction 8—8 of the modification shown in FIG. 7.

Referring to FIGS. 7 and 8 there is illustrated a further modification of the invention exemplified by the slide fastener actuating device 50. As may be seen in FIG. 7 the device 50 is provided with a handle 51 of rigid or semi-rigid rod-like construction made from metal, wood or plastic. The lower end of the handle 51 is provided with an extension of reduced diameter 51a to which is secured a tubular member 52 as by a cross pin 53. The lower end of the sleeve or tubular member 52 is provided with an end member 54 which is secured to sleeve 52 by a set screw 55. The end member 54 has a longitudinal passage 54a extending therethrough and the lower end of member 54 is of reduced diameter to provide a circular channel or recess 54b within the end of the sleeve 52.

Positioned within the sleeve 52 is a slide member 56 which is adapted to be maintained in the position shown in FIG. 7 by means of a compression spring 57 contained within the upper end of the sleeve 52. The compression spring 57 is adapted to abut the lower end of the projection 51a and the adjacent end of the slide member 56. The slide member 56 has a longitudinal passage therethrough into which extends a pin means or wire member 58 shaped in the form of a hook. The wire member 58 extends through the central passage 54a in end member 54 and into the passage 56a in member 56. The wire member 58 is adapted to be secured to member 56 by means of screw 59. The screw 59 extends through a right angle slot in the sleeve 52, the slot including a longitudinal portion 52a and a transverse portion 52b. The screw 59 may be provided with an enlarged head for operation of the device 50 or the screw may extend through an outer operating sleeve 60.

The hook shaped end of wire member 58 is provided with a button member 61 having a pair of openings therethrough through which extend the wire member 58. The return end or pin portion 58a of the wire 58 is adapted to extend through the opening in the slide fastener 22 (such as shown in FIG. 1) of the zipper 23. After the slide fastener tab 22 has been placed on the pin 58a as shown in FIG. 7 the operator presses the lower end of button member 61 causing the slide member 56 to move upwardly and compress the spring 57. This causes the screw member 59 to move upwardly in slot 52a until it reaches the transverse slot portion 52b at which time the operator rotates the screw 59 about the longitudinal axis of the device 50 as by rotating the operating sleeve 60. When the screw 59 has been rotated to the left it will enter the slot 52b and the parts of the device 50 will be locked in this position under the biasing force of the spring 57. At this time the pin 58a will have been moved upwardly so that it extends into the channel 54b. With the parts in this position the device 50 is ready to be pushed or pulled longitudinally by handle 51 to move the slide fastener and its tab 22 (such as shown in FIG. 4) along the zipper 23 in the direction required to either open or close the zipper. The button member 61 cooperates with the lower end of sleeve 52 and the end member 54 to form a transverse slot and maintain the slide fastener 22 substantially perpendicular to the pin 58a and to the zipper 23.

To release the slide fastener tab 22 from the device 50, the operating sleeve 60 is rotated to the right as viewed in FIG. 8 to move the screw 59 out of the transverse slot 52b and into the longitudinal slot 52a at which time the spring 57 will force the slide member 56 downwardly and remove the pin 58a from the recess 54b in FIG. 7. In this position the slide fastener 22 may be readily removed from the pin 58a.

Referring to FIGS. 9 and 10 there is illustrated a slide fastener actuating device 70 including an elongated handle 71 of rod-like construction. The handle 71 may be rigid or semi-rigid and made of any suitable materials such for example metal, wood or plastic. The lower end of the handle 71 has secured thereto a metal pin 72 which projects therefrom along the longitudinal axis of the handle 71. The same end of the handle 71 is provided with an extension 73 which may be secured to or integral with the handle 71. The extension 73 projects beyond the end 71a of the handle approximately the same distance as the pin 72. The extension 73 is provided with an open-end slot 73a extending transversely of the pin 72 and beyond the end 71a of the handle 71. The end 71a of the handle 71 is in the same plane as the adjacent edge of the slot 73a. The parts of device 70 as thus far described are similar to the device disclosed in my aforesaid co-pending application.

The device 70 is provided with a locking sleeve 74 having a longitudinal slot 74a therein. A screw 75 is adapted to extend through the slot 74a and into the handle 71. Thus it will be seen that the locking sleeve 74 is adapted for longitudinal movement with respect to the handle 71. As may be seen in FIGS. 9 and 10 the lower end of the locking sleeve 74 is provided with a shoulder 74b which extends longitudinally of the device 70. The slot 74a in the locking sleeve 74 is so dimensioned with respect to the screw 75 that when the sleeve 74 is in the down position as in FIG. 10 the end 74c will be in alignment with the upper edge of the slot 73a and the end 71a of handle 71. At this time the shoulder 74b will extend across the open end of slot 73a as shown in FIG. 10.

As shown in FIG. 9 the slide fastener tab 22 of the zipper 23 is connected to the slide fastener actuating device 70 by inserting the pin 72 through the opening in the fastener 22. The device 70 is then rotated in the direction of the arrow in FIG. 9 to cause the slot 73a to receive the slide fastener tab 22. The slide fastener tab 22, during this movement will move against the curved surface 74c on the lower end of sleeve 74 causing the latter to move upwardly and permit the slide fastener tab 22 to enter the slot 73b. As the device 70 is rotated in the direction of the arrow in FIG. 9 the cam surface 74c will move off of the slide fastener 22 and thus permit the sleeve 74 to drop to its lower position shown in FIG. 10. At this time the vertical shoulder 74b on sleeve 74 will close the open end of slot 73a thus locking the slide fastener tab 22 within the slot 73a. The parts of the device 70 will then be in the position shown in FIG. 10 where it will be seen that regardless of which direction the device 71 is rotated the slide fastener tab 22 will not be displaced from the slot 73a nor from the pin 72.

Thus it will be seen in FIG. 10 that the slot 73a through which the slide fastener tab 22 extends cooperates with the pin 72, the end 71a of the handle 71 and the shoulder 74b of the locking sleeve 74 to maintain the slide fastener tab 22 substantially perpendicular to the longitudinal axis of the handle 71. Since the handle 71 is of rod-like construction this relationship will be maintained during both push and pull longitudinal movements of the handle 71. To release the slide fastener tab 22 from the device 70 the locking sleeve 74 is moved in an upward direction as viewed in FIG. 10 to the position shown in FIG. 9 and the device 71 is rotated in the opposite direction from the arrow shown in FIG. 9 to move the slide fastener tab 22 out of the open end of the slot 73a. The slide fastener tab 22 may then be removed from the pin 72. Since the slide fastener device 70 is used with the handle 71 pointed downwardly as shown in FIGS. 9 and 10 the locking sleeve 74 will normally fall to the position shown in FIG. 10 under the influence of its own weight. However, it is to be understood that if desired the sleeve 74 may be provided with spring means to bias it in the position shown in FIG. 10.

Referring to FIGS. 11-13 there is illustrated a slide fastener actuating device 80 which comprises another modification of the invention. The device 80 is provided with a rod-like handle 81 similar to the handle disclosed in FIGS. 9 and 10. The lower end 81a of the handle is flat and a pin 82 projects therefrom. A curved extension 83 is carried by the handle and extends beyond the flat end 81a. The extension 83 is provided with a transverse slot 83a which is open at one end thereof. The upper edge of the slot 83a is in the same plane as the flat end 81a of the handle 81. A sleeve member 84 is carried by the handle 81 and extends around the extension 83. The sleeve 84 is adapted for rotatable movement about the longitudinal axis of the handle 81. The sleeve 84 has a transverse slot 84a therein through which extends a pin or screw member 85 to prevent the sleeve 84 from sliding off the lower end of the handle 81. The sleeve 84 is provided with a transverse open-end slot 84b which as may be seen in FIGS. 11 and 12 is on the opposite side of the pin 82 from the slot 83a.

FIGS. 11 and 12 show the device 81 in the unlocked position. In this position the pin 82 is adapted to be inserted in the opening 22a in the slide fastener tab 22. The sleeve 84 is then adapted to be rotated in the direction of the arrow in FIG. 11 until it assumes the position shown in FIG. 13. At this time the open-end slot 84b in sleeve 84 has been brought into overlapping alignment with the open-end slot 83a in extension 83. These overlapping open-ended slots 83a and 84b cooperate to form a closed-end slot which retains the slide fastener tab 22 therein and maintains the slide fastener tab 22 on the pin 82. With the parts in the position shown in FIG. 13 the screw 85 of FIG. 11 will be in engagement with the end 84c of slot 84 which preferably is provided with an offset 84d for frictional engagement with screw 85. To aid in maintaining the screw 85 in the offset 84d a spring member 86 is provided on the handle 81 and it is adapted to abut a shoulder 81b on the handle and the adjacent edge of the sleeve 84 as shown in FIG. 11. The spring 86 biases the sleeve 84 outwardly of the handle 81. It will be understood that the slide fastener actuating device 80 is utilized to actuate the slide fastener and its tab 22 in the same manner as the device 70 illustrated in FIGS. 9 and 10.

In FIG. 14 there is illustrated a slide fastener actuating device 90 which comprises another modification of the invention. The device 90 is provided with a rod-like handle 91 made from a suitable material as previously described. The lower end 91a of the handle is flat and a pin 92 projects therefrom. The handle 91 is provided with a locking structure including an arm 93 which is pivoted to the handle 91 by a pivot pin 94. The outer end of the arm 93 is provided with a locking member 95 having an open-end slot 95a therein which is adapted to receive the pin 92. The lower end of member 95 is provided with a handle 95b for convenience in operation. A tension spring 96 is connected at one end to the arm 93 and at its opposite to the handle 91.

With the parts as illustrated in full line in FIG. 14 it will be seen that the slide fastener tab 22 has been placed on the pin 92 and is locked in the slot formed between the flat end 91a of the handle 91 and the adjacent flat surface of the member 95. The tension spring 96 maintains the arm 93 in the full line position shown in FIG. 14 and the arm 93 is provided with a stop pin 93a at the rear thereof to prevent the member 95 from engaging the pin 92 and bending it. The arm 93 is provided with a second stop pin 93b which is adapted to engage the handle 91 when the arm 93 is moved to the phantom line position shown in FIG. 14. This is the open position of the device 90 and it will be seen that the tension spring 96 will maintain the parts in the open position. With the parts in the open position the opening 22a in the slide fastener tab 22 is adapted to be threaded on to the pin 92 and then the arm 93 is ready to be moved from the phantom line position to the full line position in FIG. 14. At this time the slide fastener tab 22 will be locked onto the pin 92 and the device 90 is ready to be pushed or pulled as may be required to operate the zipper 23.

Referring to FIGS. 15-18 there is illustrated a slide fastener actuating device 100 embodying a further modification of the invention. The device 100 is provided with a rod-like handle 101 of similar construction to those previously described. The lower end 101a of the handle is flat and a pin 102 projects therefrom. The handle 101 is provided with an extension 103 comprising a right angle section and having a pair of slots 103a therein the upper edges of which are in the same plane as the flat end 101a of handle 101. As may be seen in FIG. 15 the pin 102 is adapted to be inserted in the opening in the slide fastener tab 22 and the slide fastener tab 22 is adapted to be inserted in one or the other of the transverse open-end slots 103a. The construction of device 100 as thus far described is similar to the device in the aforesaid co-pending application.

Figure 15:
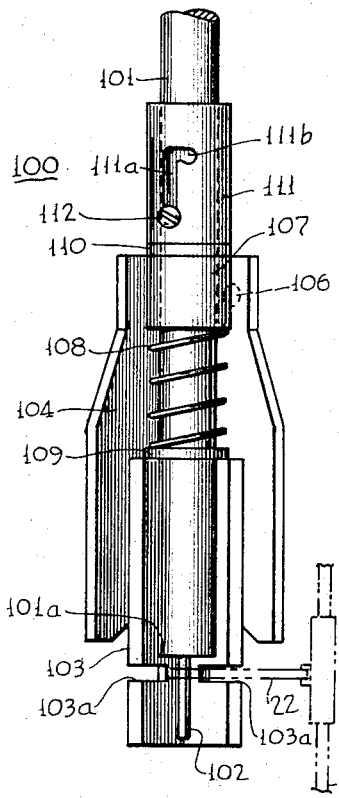
FIG. 15 is a front elevational view of a further modification of the invention.
Figure 16:
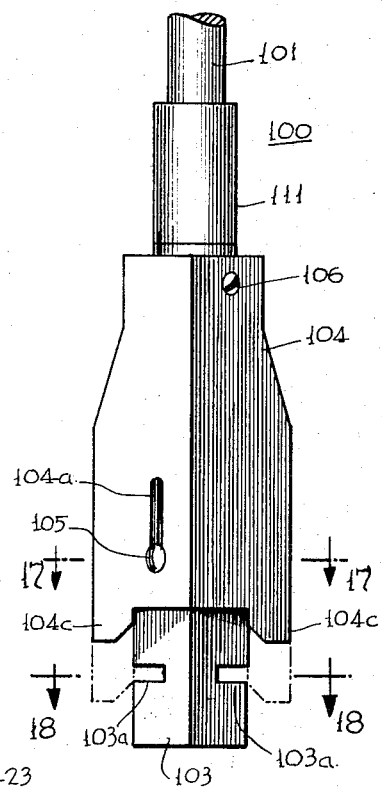
FIG. 16 is a rear elevational view of the device illustrated in FIG. 15.
Figure 17:
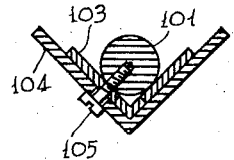
FIG. 17 is a cross sectional view taken along the plane 17—17 in FIG. 16.
Figure 18:
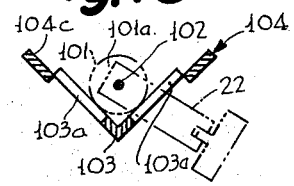
FIG. 18 is a cross sectional view taken along the plane 18—18 in FIG. 16 and showing the device therein in closed or locked position.

The handle 101 is provided with a second right angle section 104 which is adapted to slide over the surface of the section 103. In order to maintain the axial alignment of the member 104 the latter is provided with an elongated slot 104a, FIG. 16, through which extends a pin or screw member 105 and which is carried by the right angle section 103. The upper end of member 104 is secured as by a screw 106 to a sleeve member 107 slidable on the handle 101. A compression spring 108 surrounds the handle 101 intermediate the sleeve 107 and a washer 109 which engages the upper end of member 103. The upper end of the sleeve 107 engages a washer 110 which in turn engages the lower end of a locking sleeve 111. The sleeve 111 has a vertical slot 111a and a horizontal slot 111b which intersect to form a right angle. A pin or screw member 112 is secured to the handle 101 and is adapted to extend through the slots 111a and 111b. When the device 100 is in the open position the parts occupy the full line positions as shown in FIGS. 15 and 16. The compression spring 108 is adapted to maintain the parts in this position. After the slide fastener tab 22 has been inserted on the pin 102 the right angle member 104 is adapted to be moved downwardly to the phantom line position shown in FIG. 16. At this time the extensions 104c of member 104 will have been moved into overlapping position with the open-ends of the slots 103a thus locking the zipper fastener tab 22 onto the pin 102 and in one of the slots 103a. To maintain the member 104 in this position the locking sleeve 111 is adapted to be rotated so that the pin 112 is in the cross slot 111b, FIG. 15. The spring 108 which is now under greater compression will tend to maintain the parts in the locked position. The locked or closed position is illustrated in FIG. 18. It will be seen that the open-ends of the slots 103a are effectively closed by the projections 104c. Thus the slide fastener tab 22 cannot be removed from the slots 103a until the member 104 has been moved to the unlocked position illustrated in full line in FIGS. 15 and 16.

Figure 19:
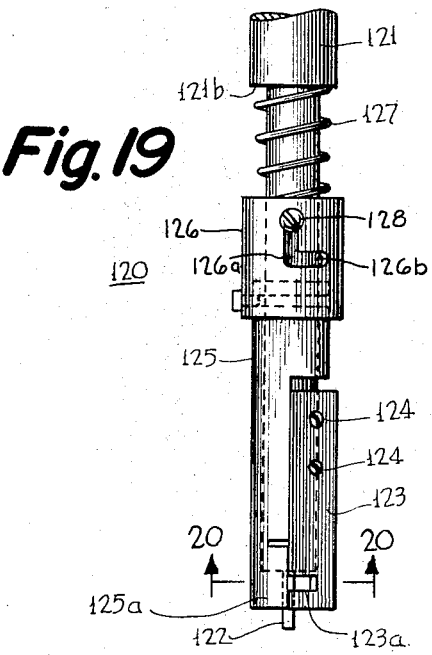
FIG. 19 is an elevational view of another modification of the invention.
Figure 20:
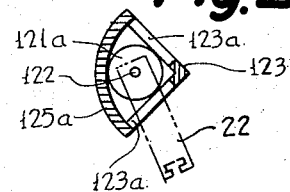
FIG. 20 is a cross sectional view taken along the plane 20—20 in FIG. 19.

Referring to FIGS. 19 and 20 there is illustrated a slide fastener actuating device 120 embodying a further modification of the invention. The device 120 is provided with a rod-like handle 121 of similar construction to those previously described. The lower end of the handle is provided with a flat surface 121a from which extends a pin 122. The handle 121 is provided with a right angle extension 123 which is adapted to be secured to the handle 121 as by screws 124. The right angle portions of the member 123 are provided with a pair of transverse open-end slots 123a. The construction described thus far is similar to that described in connection with FIGS. 15–18.

As may be seen in FIG. 20 the slide fastener tab 22 is adapted to have its opening placed onto the pin 122 and the fastener tab 22 inserted into one of the slots 123a. In order to lock the fastener tab 22 into the open-end slots 123a the handle 121 is provided with a tubular member 125 having an extension 125a as shown in FIGS. 19 and 20 which is adapted to extend across the open ends of the slots 123a. The upper end of the tubular member 125 is secured to a sleeve 126 on the handle 121. The sleeve 126 is adapted to abut against one end of a compression spring 127 the opposite end of which is adapted to engage a shoulder 121b on the handle 121. The sleeve 126 is provided with a locking slot of right angle construction. The slot includes a longitudinal portion 126a and a transverse portion 126b through which a pin 128 carried by the handle 121 is adapted to extend. When the parts are in the position shown in FIG. 19 the pin is in the upper end of the slot 126a and the spring 127 forces the member 125 downwardly maintaining the extension 125a in the locked or closed position with respect to the open-end slots 123a.

When it is desired to remove the device 120 from the slide fastener tab 22 the locking sleeve 126 is moved upwardly and rotated to the left as viewed in FIG. 19 to bring the horizontal or transverse slot 126b into engagement with the pin 128. This moves the extension 125a upwardly and out of alignment with the open ends of the slots 123a thus permitting the slide fastener tab 22 to be moved out of the open end of the slots 123a and removed from the pin 122. The compression spring 127 will be effective to maintain the parts in the unlocked position as long as the pin 128 is in the transverse slot 126b.

From the foregoing it will be seen that in each of the embodiments of the present invention the slide fastener is adapted to be locked onto pin structure carried by a rod-like handle and the mechanical locking structure is such that the slide fastener cannot be accidentally displaced from the pin structure. In each of the modifications the slide fastener tab is adapted to be maintained in a position perpendicular to the zipper for ease in operation of the zipper. As may be seen in the various modifications this is accomplished by the use of transverse slot structure the opposite tab engaging walls of which provide an effective planar support for the tab of the slide fastener.

What is claimed is:

1. A device for actuating a slide fastener including a tab of the type having an opening therein comprising
a handle of rod-like construction,
pin structure movably carried at one end of said handle and extending longitudinally thereof, said pin structure having a diameter sufficiently small to extend through the opening in the slide fastener,
structure carried by the device and cooperating with said one end of said handle to form at least one slot extending transversely of said pin structure and beyond said one end of said handle, said slot having opposite walls extending substantially transversely of said pin structure, said walls having substantially planar support means for engaging the tab of said slide fastener, one of said walls being formed by a member from which said pin structure extends and facing the other wall formed by said one end of said handle, said slot being constructed and arranged to receive the slide fastener after it is positioned on said pin structure and said opposite walls of said slot being shaped so as to cooperate with said pin structure in maintaining said slide fastener tab substantially perpendicular to the longitudinal axis of said handle during both push and pull longitudinal movements of said handle, and
means in addition to said pin structure to releasably lock the slide fastener tab in said slot regardless of the direction of movement of the slide fastener relative to said pin structure.

2. A device for actuating a slide fastener according to claim 1 wherein said pin structure comprises part of a hook shaped member, said hook shaped member having thereon said structure which cooperates with said one end of said handle to form said slot extending transversely of said pin structure,
said hook shaped member being carried by a slidable means within said handle, and
said means to lock the slide fastener tab in said slot comprises structure for locking said slide means relative to said handle.

3. A device for actuating a slide fastener of the type including a tab having an opening therein comprising:
a handle of rod-like construction.
pin structure carried at one end of said handle and extending longitudinally thereof, said pin structure having a diameter sufficiently small to extend through the opening in the tab of the slide fastener,
structure carried by said handle and including a longitudinal edge and extending beyond said one end of said handle,
said one end of said handle being substantially perpendicular to the longitudinal axis of said handle and cooperating with said structure to form a slot extending transversely of said pin structure from said longitudinal edge and beyond said one end of said handle, said slot being constructed and arranged to receive the slide fastener tab after it is positioned on said pin structure and to cooperate with said pin structure in maintaining said slide fastener tab substantially perpendicular to the longitudinal axis of said handle during both push and pull longitudinal movements of said handle, and
movable means in addition to said pin structure to releasably lock the slide fastener tab in said slot regardless of the direction of movement of the slide fastener relative to said pin structure,
said movable means to lock the slide fastener in said slot comprising locking structure carried by said handle and slidable into overlapping relation with respect to the open end of said slot for preventing removal of the slide fastener tab from said slot.

4. A device for actuating a slide fastener according to claim 3 including means for maintaining said locking structure in said overlapping relation with the open end of said slot.

5. A device for actuating a slide fastener according to claim 4 wherein said means for maintaining said locking structure in overlapping relationship with the open end of said slot includes spring means.

6. A device for actuating a slide fastener of the type having a tab with an opening therein comprising
a handle of rod-like construction,
a hollow extension on one end of said handle,
slide means positioned within said tubular extension for movement longitudinally thereof,
means at the outer end of said extension including structure to prevent said slide means from sliding out of the end of said extension,
spring means positioned within said extension between said one end of said handle and the adjacent end of said slide means for biasing said slide means in the direction of said outer end of said extension,
pin means carried by said slide means,
said means at said outer end of said extension having at least one passage therethrough for said pin means,
the outer end of said pin means being hook shaped and including structure having a substantially flat surface from which said outer end of said pin means extends, said outer end of said pin means being so constructed and arranged to extend through the opening in the tab of the slide fastener so that said surface cooperates with said means at said outer end of said extension in maintaining the slide fastener tab substantially perpendicular to the longitudinal axis of said handle during both push and pull longitudinal movements of said handle, and
structure engaging said slide means and extending through the wall of said extension to lock said pin means relative to said outer end of said extension.

7. A device for actuating a slide fastener according to claim 6 wherein said slide means comprises
three sections interconnected by a common pin, the two end sections being fixed to said pin and the middle section being pivotally carried by said pin,
spring means connected to said middle section for rotation thereof about the axis of said pin, and
means carried by said middle section and extending through the wall of said extension for locking and unlocking the device.

8. A device for actuating a slide fastener according to claim 6 including
a sleeve surrounding said extension and connected to said slide means for actuation thereof.

9. A device for actuating a slide fastener of the type having a tab with an opening therein comprising
a handle of rod-like construction,
pin structure carried by one end of said handle and extending longitudinally thereof, said pin structure having a diameter sufficiently small to extend through the opening in the slide fastener,
fixed structure carried by said one end of said handle and including a longitudinal edge,
said fixed structure comprising at least one open-end slot extending transversely of the pin structure from said longitudinal edge and beyond said one end of said handle,
said slot being constructed and arranged to receive the tab of the slide fastener after it is positioned on the said pin structure and to cooperate with said pin structure in maintaining the tab of said slide fastener substantially perpendicular to the longitudinal axis of said handle during both push and pull longitudinal movements of said handle, and
means carried by said handle for slidable movement of controlled length to close said open end of said slot and lock the tab of the slide fastener in said slot and on said pin structure.

10. A device for actuating a slide fastener according to claim 9 wherein said last-named means comprises
sleeve structure slidably carried by said handle for limited longitudinal movement, said sleeve structure having shoulder structure adapted to be moved into overlapping engagement with said open end of said slot to lock the tab of the slide fastener within said slot and on said pin structure.

11. A device for actuating a slide fastener according to claim 9 wherein said last-named means comprises
a sleeve rotatably carried by said handle, said sleeve having structure adapted to be moved into and out of overlapping relation with the open end of said slot during rotation of said sleeve to lock the tab of the slide fastener within said slot.

12. A device for actuating a slide fastener according to claim 11 including spring means carried by said handle and engageable with said sleeve means to maintain said sleeve means in the required position to close said open end of said slot.

13. A device for actuating a slide fastener of the type including a tab having an opening therein comprising
a handle of rod-like construction having a substantially flat end,
pin structure carried by said flat end of said handle and extending longitudinally thereof, said pin structure having a diameter sufficiently small to extend through the opening in the tab of the slide fastener,
right angle structure carried by said handle and including a longitudinal edge extending beyond said flat end, said right angle structure having at least one open-end slot extending transversely of said pin structure from said longitudinal edge and beyond said flat end of said handle,
said slot being adapted to receive the tab of the slide fastener after it is positioned on said pin structure and to cooperate with said pin structure in maintaining said slide fastener tab substantially perpendicular to the longitudinal axis of said handle during both push and pull longitudinal movements of said handle, and
structure carried by said handle and slidable longitudinally thereof into overlapping relation with said open end of said slot to close said slot on the slide fastener tab and maintain the slide fastener tab on said pin structure.

14. A device for actuating a slide fastener according to claim 13 wherein said slidable structure comprises
a second right angle structure slidably carried on the back of said first-named right angle structure.

15. A device for actuating a slide fastener according to claim 13 wherein said slidable structure comprises
a tubular member slidably carried by said handle and including a portion adapted to span the edges of said right angle section in the area of the open end of said slot.

16. A device for actuating a slide fastener of the type including a tab having an opening therein comprising
a handle of rod-like construction,
a tubular extension carried at one end of said handle,
an end member secured to the outer end of said tubular extension and having a pair of longitudinal openings therethrough,
a slide member positioned within said tubular extension,
first compression spring means positioned within said tubular extension between the one end of said handle and the adjacent end of said slide member,
said slide member having an inclined cam surface positioned between two transverse shoulders,
a cross-pin extending transversely through said slide member, said cross-pin having a head adapted to extend into a slot in the wall of said tubular extension, the opposite end of said cross-pin extending through the opposite wall of said tubular extension, a second compression spring carried by said opposite end of said cross-pin and engaging the outer surface of said tubular extension, means carried by said opposite end of said cross pin and engageable with the opposite end of said second compression spring to maintain said second compression spring against the outer surface of said tubular extension, a hook shaped member carried by the opposite end of said slide member, said hook shaped member being adapted to extend through said pair of longitudinal openings in said end member and the opening in the tab of said slide fastener, and a button member carried by said hook shaped member and adapted to cooperate with said end member in maintaining the tab of the slide fastener on said hook shaped member and parallel to the longitudinal axis of said handle when said shoulder at the opposite end of said slide member is engaging said head of said cross-pin.

17. A device for actuating a slide fastener of the type including a tab having an opening therein comprising:
a handle of rod-like construction,
slide means carried by said handle adjacent one end thereof for movement longitudinally thereof,
means to prevent said slide means from sliding off said one end of said handle,
spring means carried by said handle for biasing said slide means for movement in a longitudinal direction relative to said one end of said handle,
pin means carried by said slide means and having an outer end extending toward said one end of said handle, a transverse surface from which said outer end of said pin means projects and facing said one end of said handle, said transverse surface and said one end of said handle both having opposed planar support means for engaging the opposite sides of the slide fastener tab, said outer end of said pin means being so constructed and arranged to extend through the opening in the slide fastener tab and cooperate with said one end of said handle and said surface in maintaining the slide fastener tab substantially perpendicular to the longitudinal axis of said handle during both push and pull longitudinal movements of said handle, and
structure carried by said handle and engaging said slide means releasably to lock said pin means relative to said one end of said handle.

18. A device for actuating a slide fastener of the type including a tab having an opening therein comprising:
a handle of rod-like construction,
a hollow extension on one end of said handle, slide means positioned within said extension for movement longitudinally thereof,
means at the outer end of said extension including structure to prevent said slide means from sliding out of the end of said extension,
spring means positioned within said extension between said one end of said handle and the adjacent end of said slide means for biasing said slide means in the direction of said outer end of said extension,
pin means carried by said slide means, said means at said outer end of said extension having at least one passage therethrough for said pin means, the outer end of said pin means being hook-shaped and being so constructed and arranged to extend through the opening in the slide fastener tab and cooperate with said means at said outer end of said extension in maintaining the slide fastener tab substantially perpendicular to the longitudinal axis of said handle during both push and pull longitudinal movements of said handle, and structure engaging said slide means and extending through the wall of said extension to lock said pin means relative to said outer end of said extension, said slide means including an inclined cam surface having shoulders at the opposite ends of said surface extending transversely thereof, said structure engaging said slide means comprising spring biased cross-pin structure extending through said slide means and having structure adapted to engage said cam surface on said slide means and said shoulders at said opposite ends thereof.

19. A device for actuating a slide fastener of the type including a tab having an opening therein comprising:
a handle of rod-like construction,
slide means carried by said handle adjacent one end thereof for movement longitudinally thereof,
means to prevent said slide means from sliding off said one end of said handle,
spring means carried by said handle biasing said slide means for movement in a longitudinal direction relative to said one end of said handle,
pin means carried by said slide means and having an outer end extending toward said one end of said handle, said outer end of said pin means being so constructed and arranged to extend through the opening in the slide fastener tab and cooperate with said one end of said handle in maintaining the slide fastener tab substantially perpendicular to the longitudinal axis of said handle during both push and pull longitudinal movements of said handle,
said slide means having an inclined cam surface having shoulders at the opposite ends of said surface extending transversely thereof, and
resiliently biased locking means carried by said handle and having structure adapted to engage said cam surface on said slide means and said shoulders at said opposite ends thereof to lock said pin means relative to said one end of said handle.

20. A device for actuating a slide fastener of the type including a tab having an opening therein comprising:
a handle of rod-like construction,
pin structure carried at one end of said handle and extending longitudinally thereof,
said pin structure having a diameter sufficiently small to extend through the opening in the slide fastener,
movable structure carried by the device at said one end of said handle, said movable structure and said one end of said handle respectively having means providing an effective planar support for said slide fastener tab to form an open end slot extending transversely of said pin structure,
said slot being constructed and arranged to receive the slide fastener tab while it is positioned on said pin structure and to cooperate with said pin structure in maintaining said slide fastener tab substantially perpendicular to the longitudinal axis of said handle during both push and pull longitudinal movements of said handle, and
means in addition to said pin structure to releasably lock the slide fastener tab in said slot regardless of the direction of movement of the slide fastener relative to said pin structure.

21. A device for actuating a slide fastener of the type including a tab having an opening therein comprising:
a handle of rod-like construction,
pin structure movably carried at one end of said handle and extending longitudinally thereof,
said pin structure having a diameter sufficiently small to extend through the opening in the slide fastener tab,
structure extending across said pin structure and carried by the device at said one end of said handle to form an open end slot extending transversely of said pin structure, said slot having opposite walls extending substantially transversely of said pin structure, said walls having tab engaging surfaces providing substantially planar support for said slide fastener tab, said pin structure fixedly extending from one of said walls, said slot being constructed and arranged to receive the slide fastener tab while it is positioned on said pin structure with said pin structure extending across said slot at the open end thereof and to cooperate with said pin structure in maintaining said slide fastener tab substantially perpendicular to the longitudinal axis of said handle during both push and pull longitudinal movements of said handle, and spring means acting on said movably carried pin structure to releasably lock the tab of the slide fastener in said slot.

22. A device for actuating a slide fastener of the type including a tab having an opening therein comprising:

a handle of rod-like construction, pin structure carried at one end of said handle and extending longitudinally thereof, said pin structure having a diameter sufficiently small to extend through the opening in the tab of the slide fastener, structure carried by the device and cooperating with said one end of said handle to form at least one slot extending transversely of said pin structure and beyond said one end of said handle, said slot being constructed and arranged to receive the slide fastener tab after it is positioned on said pin structure and to cooperate with said pin structure in maintaining said slide fastener tab substantially perpendicular to the longitudinal axis of said handle during both push and pull longitudinal movements of said handle, means in addition to said pin structure to lock the tab of the slide fastener in said slot regardless of the direction of movement of the slide fastener realtive to said pin structure, said structure carried by the device and cooperating with said one end of said handle being pivotally carried by said handle and being provided with an open-end slot which is adapted to receive said pin structure, and said means to lock the slide fastener tab in said slot includes an elongated tension spring means connected to said structure and to said handle and having the portion wrapped partially around said handle adjacent the handle pivot so as to be movable across the axis of said handle pivot.

23. A device for actuating a slide fastener according to claim 21 wherein said pin structure comprises part of a hook-shaped member, said hook-shaped member having thereon said structure which cooperates with said one end of said handle to form said slot extending transversely of said pin structure, said hook-shaped member being carried by slidable means within said handle.

24. A device for actuating a slide fastener of the type including a tab having an opening therein comprising:

a handle of rod-like construction, a tubular portion on one end of said handle, slide means positioned within said tubular portion for movement longitudinally thereof, plug means at the outer end of said tubular portion, spring means positioned within said tubular portion for biasing said slide means in a longitudinal direction between said plug means and said one end of said handle, pin means carried by said slide means, said plug means having at least one passage therethrough for said pin means, said outer end of said pin means being hook-shaped, said hook-shaped end including structure having a substantially flat surface area facing a substantially flat surface area on said plug means, said outer end of said pin means being so constructed and arranged to extend through the opening in the slide fastener tab and said substantially flat surface area on said structure cooperates with said substantially flat surface area on said plug means in maintaining the slide fastener tab substantially perpendicuar to the longitudinal axis of said handle during both push and pull longitudinal movements of said handle, and structure carried by said slide means and cooperating with structure extending through the wall of said tubular portion to releasably lock said pin means relative to said plug means.

25. A device for actuating a slide fastener according to claim 24 wherein said slide means includes an inclined cam surface, and cross-pin structure extending through said slide means and having structure adapted to engage said cam surface on said slide means to control movement of said slide means.

26. A device for actuating a slide fastener of the type including a tab having an opening therein comprising:

a handle of rod-like construction having a hollow extension at one end thereof, structure at the outer end of said extension forming an open-end slot extending transversely of the longitudinal axis of said handle, slide means positioned within said hollow extension, compression spring means positioned within said hollow extension and adapted to exert a force in a longitudinal direction on said slide means, said slide means having an inclined cam surface extending therealong, a cross-pin extending transversely of said slide means, said cross-pin having structure adapted to engage said inclined cam surface on said slide means, at least one end of said cross-pin extending through the side wall of said hollow extension for manual movement of said cross-pin relative to said inclined cam surface on said slide means, and pin means carried by said slide means and adapted to extend transversely through said open-end slot, said pin means being adapted to extend through the opening in the slide fastener tab and lock the slide fastener tab within said open-end slot in a position perpendicular to the longitudinal axis of said handle.

References Cited

UNITED STATES PATENTS

| 828,823 | 8/1906 | Maize | 24—241 X |
| 967,486 | 8/1910 | Avery | 24—241 |
| 1,182,790 | 5/1916 | Piper | 294—26 X |
| 1,224,921 | 5/1917 | Hadley | 24—241 X |
| 1,454,550 | 5/1923 | Mabry | 24—158 |
| 2,516,657 | 7/1950 | Spendlove. | |
| 2,553,782 | 5/1951 | Orchard | 24—162 |
| 2,570,538 | 10/1951 | Fincher | 294—26 |
| 2,898,141 | 8/1959 | Perryn. | |
| 3,241,205 | 3/1966 | Genin. | |

FOREIGN PATENTS

| 531,776 | 1/1941 | Great Britain. |

BERNARD A. GELAK, *Primary Examiner.*